United States Patent [19]

Keogh

[11] Patent Number: 4,552,941

[45] Date of Patent: Nov. 12, 1985

[54] POLYSILOXANES FROM ACYLOXYSILANES USING ORGANO METALLIC CATALYST

[75] Inventor: Michael J. Keogh, Bridgewater, N.J.

[73] Assignee: Union Carbide Corporation, Danbury, Conn.

[21] Appl. No.: 439,173

[22] Filed: Nov. 5, 1982

Related U.S. Application Data

[63] Continuation-in-part of Ser. No. 294,784, Aug. 10, 1981, Pat. No. 4,369,289, which is a continuation-in-part of Ser. No. 192,319, Sep. 30, 1980, Pat. No. 4,327,323, which is a continuation-in-part of Ser. No. 70,785, Aug. 29, 1979, Pat. No. 4,291,136, which is a continuation-in-part of Ser. No. 892,153, Mar. 31, 1978, abandoned.

[51] Int. Cl.$^4$ .................. C08G 77/08; C08G 77/18
[52] U.S. Cl. ............................... 528/16; 528/14; 528/17; 528/18; 528/41; 556/37; 556/40
[58] Field of Search ............... 528/41, 18, 14, 16, 528/17; 556/37, 40

[56] References Cited

U.S. PATENT DOCUMENTS

| | | | |
|---|---|---|---|
| 3,109,011 | 10/1963 | Pike et al. | 528/41 |
| 3,193,567 | 7/1965 | Rossmy | 556/443 |
| 3,647,917 | 3/1972 | Schulz et al. | 528/18 |
| 4,291,136 | 9/1981 | Keogh | 525/102 |
| 4,328,323 | 5/1982 | Keogh | 525/106 |

FOREIGN PATENT DOCUMENTS

| | | | |
|---|---|---|---|
| 4752 | 3/1979 | European Pat. Off. | |
| 875759 | 8/1961 | United Kingdom | 528/41 |
| 1450934 | 9/1976 | United Kingdom | |

OTHER PUBLICATIONS

Article by Gerd Rossmy and Gotz Koerner: 1,2-Siloxyacycloalkanes, Part 1: Synthesis and Polymerization Properties, pp. 1–31.

Article by M. G. Voronkov et al: Siloxane Bond, Nauka Publishers, Siberian Division of the USSR Academy of Sciences, Novossibirsk, 1976, pp. 221–222.

*Primary Examiner*—Wilbert J. Briggs, Sr.

[57] ABSTRACT

Polysiloxanes produced by polymerizing a monomeric silane in the presence of an organo metallic catalyst and the use of the polysiloxanes to react with alkylene-alkyl acrylate copolymers to produce silane modified, water curable polymers.

28 Claims, No Drawings

POLYSILOXANES FROM ACYLOXYSILANES USING ORGANO METALLIC CATALYST

This application is a continuation-in-part of application Ser. No. 294,784, filed Aug. 10, 1981, now U.S. Pat. No. 4,369,289, granted Jan. 18, 1983 which in turn is a continuation-in-part of application Ser. No. 192,319, filed Sept. 30, 1980, now U.S. Pat. No. 4,327,323, granted May 4, 1982, which in turn is a continuation-in-part of application Ser. No. 70,785, filed Aug. 29, 1979, now U.S. Pat. No. 4,291,136, granted Sept. 22, 1981, which in turn is a continuation-in-part of application Ser. No. 892,153, filed Mar. 31, 1978, now abandoned.

SUMMARY OF THE INVENTION

This invention relates to polysiloxanes having the formula:

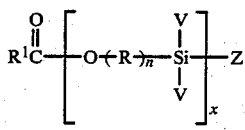

wherein R is a hydrocarbon radical or oxy substituted hydrocarbon radical, $R^1$ is a hydrocarbon radical, Z is an alkoxy radical, each V, which can be the same or different, is hydrogen, a hydrocarbon radical or a hydrolyzable group, n is an integer having a value of one to 18 inclusive and x is an integer having a value of at least 2. The polysiloxanes of this invention can be reacted with alkylene-alkyl acrylate copolymers to produce silane modified alkylene-alkyl acrylate copolymers suitable for use as water curable extrudates about electrical conductors, providing coatings thereon characterized by improved surface characteristics.

BACKGROUND OF THE INVENTION

Water curable, silane modified copolymers of alkylene-alkyl acrylates and a process for the preparation thereof by reacting a mixture containing a silane and a alkylene-alkyl acrylate copolymer are described in detail in my U.S. Pat. No. 4,291,136, granted Sept. 22, 1981. The silane modified copolymers, as described in this patent, can be extruded about electrical conductors such as wire and cable and water cured to crosslinked products to provide insulation and jacketing thereon of excellent quality.

It is customary, prior to extruding silane modified alkylene-alkyl acrylate copolymers about wire and cable, to insure removal therefrom of undesirable volatiles. The presence of undesirable volatiles could lead to the formation of voids in the extruded coating, marring the appearance of the final product and, in some instances, shortening its working life. In addition, removal of undesirable volatiles from the silane modified copolymers reduces odor problems at the extruder and in the coated wire or cable. Obviously, removal of volatiles from the silane modified copolymers, increases the time required to produce a coated product and, also, increases the overall cost thereof.

DESCRIPTION OF THE INVENTION

The present invention provides for the production of silane modified copolymers of alkylene-alkyl acrylates, which are free of undesirable volatiles and consequently need not be subjected to a subsequent devolatilization step, by reacting an alkylene-alkyl acrylate copolymer with a polysiloxane, as will be subsequently described. The silane modified copolymers, prepared in accordance with the present invention, can be directly extruded about wires and cables and water cured to crosslinked products to provide insulation and jacketing thereon, free of undesirable voids and odors.

The polysiloxanes which are reacted with alkylene-alkyl acrylate copolymers to produce water curable, silane modified alkylene-alkyl acrylate copolymers are characterized by the formula:

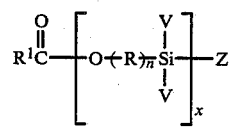

FORMULA I wherein R is a hydrocarbon radical or oxy substituted hydrocarbon radical, $R^1$ is a hydrocarbon radical, Z is an alkoxy radical, each V, which can be the same or different, is hydrogen, a hydrocarbon radical or a hydrolyzable group; n is an integer having a value of one to 18 inclusive and x is an integer having a value of at least 2, generally 2 to 1000 inclusive, preferably 5 to 25 inclusive.

Illustrative of suitable radicals for R are alkylene radicals having one to 18 carbon atoms inclusive, preferably one to 6 carbon atoms inclusive, such as methylene, ethylene, propylene, butylene, hexylene and the like; oxy substituted hydrocarbon radicals exemplified by alkoxy radicals having one to 18 carbon atoms inclusive, preferably one to 6 carbon atoms inclusive such as methyloxymethyl, methyloxypropyl, ethyloxyethyl, ethyloxypropyl, propyloxypropyl, propyloxybutyl, propyloxyhexyl and the like.

As stated, each V can be hydrogen, a hydrocarbon radical or a hydrolyzable group. Illustrative of suitable hydrocarbon radicals are alkyl radicals having one to 18 carbon atoms inclusive, preferably one to 6 carbon atoms inclusive such as methyl, ethyl, n-propyl, isopropyl, n-butyl, n-hexyl and the like; alkoxy radicals having one to 18 carbon atoms inclusive, such as methoxy, ethoxy, propoxy, hexoxy, dodecyloxy, ethoxyethoxy and the like; aryl radicals having 6 to 8 carbon atoms inclusive such as phenyl, methylphenyl, ethylphenyl and the like; cycloaliphatic radicals having 5 to 8 carbon atoms inclusive, such as cyclopentyl, cyclohexyl and the like.

$R^1$ is a hydrocarbon radical, as for example, an alkyl radical having one to 18 carbon atoms inclusive, preferably one to four carbon atoms inclusive, such as methyl, ethyl, n-propyl, isopropyl, n-butyl and the like; alkylene radicals having two to 18 carbon atoms inclusive, preferably two to 4 carbon atoms inclusive, aryl radicals having six to 10 carbon atoms inclusive such as phenyl, benzyl and the like. Z is an alkoxy radical as defined for V and R.

Repeating units within the polysiloxanes can be varied by using a mixture of two or more different silanes as exemplified by Example 5 of this specification.

The polysiloxanes of this invention are considered to be characterized by improved solubilization in alkylene-alkyl acrylate copolymer systems and by greater shelf life, being resistant to hydrolysis.

Increased solubilization results in a more rapid and efficient reaction involving the polysiloxanes and the alkylene-alkyl acrylate copolymers. Homogeneous systems, due to solubilization, will react more rapidly than heterogeneous systems. Also, a heterogeneous system, one in which the polysiloxane is not adequately dispersed, promotes extrusion instability through lubrication, by the undispersed polysiloxane, of the working parts of the extruder, wherein the reaction between the polysiloxane and the alkylene-alkyl acrylate copolymer is conveniently conducted.

Polysiloxanes are conveniently prepared by reacting a mixture containing a silane or mixtures of silanes falling within the scope of Formula II and an organo metallic polymerization catalyst such as a metal carboxylate.

FORMULA II

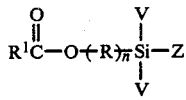

wherein the variables are as previously defined.

Exemplary of suitable silanes falling within the scope of Formula II are the following:

    acetooxyethyltrimethoxy silane

    acetooxyethyltriethoxy silane

    acetooxyethyl-tris-(2-methoxyethoxy) silane

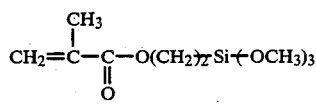    β-methacryloxyethyltrimethoxy silane

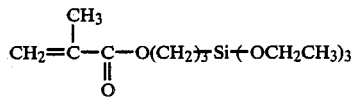    γ-methacryloxypropyltriethoxy silane

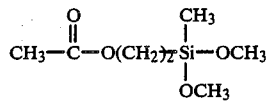    acetooxyethylmethyldimethoxy silane

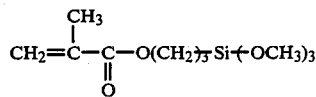    γ-methacryloxypropyltrimethoxy silane

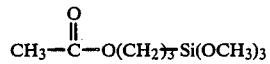    acetooxypropyltrimethoxy silane

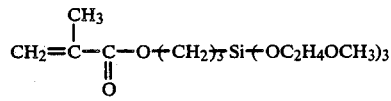    γ-methacryloxypropyl-tris-2-methoxyethoxy) silane

Among suitable organo metallic polymerization catalysts for purposes of this invention can be noted metal carboxylates such as dibutyltin dilaurate, stannous acetate, stannous octoate, lead naphthenate, zinc octoate, iron-2-ethyl hexoate and the like. Other suitable catalysts include aluminum isopropoxide, zirconium n-propoxide and the like.

At least a catalytic amount of polymerization catalyst is used to produce the polysiloxanes, that is an amount sufficient to catalyze the polymerization reaction to produce a polysiloxane. As a rule, the amount of catalyst used is on the order of about 0.001 to about 25 percent by weight based on the weight of the monomeric silane. It is preferred to use about 0.5 to about 5 percent by weight based on the weight of the monomeric silane.

Preferred polysiloxanes have a viscosity of about 0.5 poise to about 150 poise, preferably about one to about 20 poise as determined by a Gardner Holdt bubble viscometer at a temperature of 25° C.

The temperature at which the reaction is conducted can be varied over a wide range, for example from about 0° C. to about 250° C. A temperature in the range of about 70° C. to about 130° C. is preferred. Also, the reaction can be conducted using a suitable solvent, illustrated by hydrocarbon solvents such as toluene, xylene, cumene, decaline, dodecane, chlorobenzene and the like.

The reaction to produce a polysiloxane can be conducted under atmospheric, subatmospheric or superatmospheric pressure. It is preferred to conduct the later stages of the reaction under subatmospheric pressure to allow for more facile removal of volatile by-products. Also, the reaction is preferably conducted under the atmosphere of an inert gas such as nitrogen or argon to avoid formation of a gel, due to the water sensitivity of the product.

Completion of the reaction is evidenced by cessation of the evolution of volatiles and the weight/volume of volatiles collected as compared to the theoretical weight/volume. Alternatively, the reaction can be run to a desired viscosity level and the reactants cooled to stop the reaction.

The alkylene-alkyl acrylate copolymers with which the polysiloxanes are reacted to form the silane modified copolymers are known copolymers produced by reacting an alkene with an alkyl acrylate.

Suitable alkenes are ethylene, propylene, butene-1, hexene-1, heptene-1, octene-1 and the like and mixtures thereof.

The alkylene moiety of the alkylene-alkyl acrylate copolymer generally contains from 2 to 18 carbon atoms inclusive, preferably 2 to 3 carbon atoms inclusive.

Suitable alkyl acrylate monomers which are copolymerized with the alkenes fall within the scope of the following formula:

FORMULA III

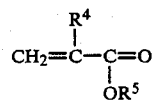

wherein $R^4$ is hydrogen or methyl and $R^5$ is alkyl having one to 8 carbon atoms inclusive. Illustrative compounds encompassed by this formula are: methyl acrylate, ethyl acrylate, t-butyl acrylate, methyl methacrylate, n-butyl acrylate, n-butylmethacrylate, 2-ethylhexyl acrylate, chloroethyl acrylate and the like and mixtures thereof.

Alkylene-alkyl acrylate copolymers generally have a density (ASTM D-1505 with conditioning as in ASTM D 147-72) of about 0.92 to about 0.94 and a melt index (ASTM D-1238 at 44 psi tested pressure) of about 0.5 to about 500 decigrams per minute.

For purposes of the present invention, the preferred copolymer is a copolymer of alkylene-alkyl acrylate, generally having about one to about 50 percent by weight combined alkyl acrylate, preferably having about 2 to about 30 percent by weight combined alkyl acrylate.

The production of a silane modified copolymer of an alkylene-alkyl acrylate is carried out by reacting a polysiloxane, as described, with a copolymer of an alkylene-alkyl acrylate in the presence of an organo titanate as described in my U.S. Pat. No. 4,328,323, granted May 4, 1982.

The amount of polysiloxane used can vary from about 0.05 to about 10 preferably about 0.3 to about 5 percent by weight based on the weight of the copolymer.

The temperature at which this reaction is carried out is not critical and can vary, conveniently, from about 80° C. to about 300° C. and preferably from about 150° C. to about 230° C.

The reaction can be carried out at atmospheric, subatmospheric or superatmospheric pressure, although atmospheric pressure is preferred and in the presence of solvents as previously described.

Completion of the reaction is evidenced by measurement of no further viscosity change.

Recovery of the silane modified copolymer is effected by allowing the contents of the reaction flask to cool and discharging into a suitable receiver for storage preferably under an inert gas blanket.

The reaction can be carried out in any suitable apparatus, preferably an apparatus in which the copolymer is subjected to mechanical working such as a Brabender mixer, a Banbury mixer or an extruder. The polysiloxane can be added to the fluxed copolymer and organo titanate, then added. Alternatively, organo titanate can be added to the copolymer prior to the addition of the polysiloxane or vice versa. Also, organo titanate and polysiloxane can be mixed together and added to the copolymer.

The reaction between the alkylene-alkyl acrylate copolymer and the polysiloxane may be depicted by the following equation:

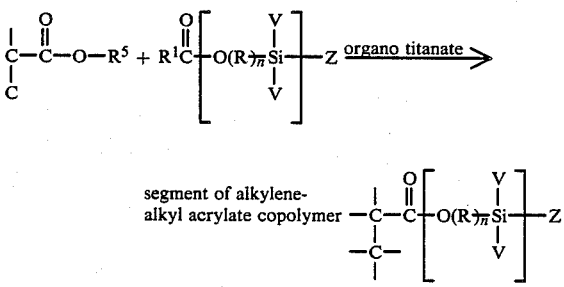

wherein the variables are as previously defined and the silicon containing unit is present in an amount of at least about 0.05 percent by weight, generally about 0.1 to about 10 percent by weight and preferably about 0.3 to about 5 percent by weight based on the total weight of the modified copolymer.

The curing or crosslinking of the silane modified alkylene-alkyl acrylate copolymer is effected by exposing the copolymer to moisture. The moisture present in the atmosphere is usually sufficient to permit curing over a period of 48 hours.

The rate of curing, in a matter of 30 minutes, can be accelerated by exposure to an artificially humidified atmosphere or immersion in water, and heating to elevated temperatures or by exposure to steam.

Generally, curing is effected at temperatures on the order of about 23° C. to about 100° C., preferably about 70° C. to about 100° C.

Also, a wide variety of materials which function as silanol condensation catalysts and which are known in the art can be employed in the crosslinking process and can be added during preparation of the silane modified copolymer. Such materials include metal carboxylates, previously described, organic bases such as ethylamine, hexylamine, dibutylamine and piperidine and the like and acids such as mineral acids and fatty acids and the like.

To the silane modified copolymers may be added various additives, in amounts well known in the art, such as fillers among which can be mentioned carbon black, clay, talc, calcium silicate, calcium carbonate, silica, aluminum hydroxide and the like, antioxidants such as 1,2-dihydro-2,3,4-trimethyl quinoline and the like.

The silane modified copolymers can be rendered flame retardant by the addition thereto of halogen containing flame retardants such as pentabromodiphenyl oxide, octabromodiphenyl oxide, decabromodiphenyl oxide, ethylene-bis-(tetrabromophthalimide), chlorinated polyethylene, polyvinyl chloride and halogenated paraffin waxes, alone, or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate as further disclosed in my copending application Ser. No. 294,784, filed Aug. 10, 1981, now U.S. Pat. No. 4,369,289, the disclosure of which is incorporated herein by reference.

The following examples further illustrate the present invention and are not intended to limit the scope thereof in any manner.

PREPARATION OF POLYSILOXANES

A 100 cc, round bottom, 3-necked flask, equipped with an air condenser, thermometer, gas inlet tube and magnetic stirring bar, was mounted securely in a liquid heating bath, positioned on a Cole-Palmer Instrument Co. stirrer-hot plate, and dried using a continuous flow of nitrogen. With the nitrogen sweep in operation, 53.6 grams (50.0 cc) of acetooxyethyltrimethoxy silane were charged into the flask and the temperature of the silane brought to about 75° C. At this point, an organo metallic catalyst was added to the flask. The reactants, catalysts, reaction conditions and products obtained are tabulated in Table 1 and Table 2, wherein the percent by weight catalyst is based on the silane.

TABLE 1

| Example | Catalyst and Amount | Temperature at Which Reaction Was Initiated | Time of Reaction | Reaction Temperature Range | Viscosity Of Product, Poise | By-Product |
|---|---|---|---|---|---|---|
| 1 | zirconium n-propoxide 10 percent by weight | 95° C. | 20 minutes | 95–130° C. | 1.6 | methyl acetate |
| 2 | stannous octoate 2 percent by weight | 115° C. | 20 minutes | 115–135° C. | 0.7 | methyl acetate |
| 3 | aluminum isopropoxide 10 percent by weight | 87° C. | 50 minutes | 87–130° C. | 0.005 | methyl acetate |
| 4 | dibutyltin dilaurate 2 percent by weight | 100° C. | 60 minutes | 100–130° C. | 3.9 | methyl acetate |

Structural formulas for polysiloxanes of Examples 1 through 4 are set forth below wherein the number of repeating units was determined empirically and the end groups confirmed by nuclear magnetic resonance (Carbon 13)

| Polysiloxane | Structural Formula |
|---|---|
| Example 1 | $CH_3-\underset{\underset{O}{\parallel}}{C}-[-O-CH_2-CH_2-\underset{\underset{OCH_3}{\mid}}{\overset{\overset{OCH_3}{\mid}}{Si}}-]_8-O-CH_3$ |
| Example 2 | $CH_3-\underset{\underset{O}{\parallel}}{C}-[-O-CH_2CH_2-\underset{\underset{OCH_3}{\mid}}{\overset{\overset{OCH_3}{\mid}}{Si}}-]_5-O-CH_3$ |
| Example 3 | $CH_3-\underset{\underset{O}{\parallel}}{C}-[-O-CH_2CH_2-\underset{\underset{OCH_3}{\mid}}{\overset{\overset{OCH_3}{\mid}}{Si}}-]_2-O-CH_3$ |
| Example 4 | $CH_3-\underset{\underset{O}{\parallel}}{C}-[-O-CH_2CH_2-\underset{\underset{OCH_3}{\mid}}{\overset{\overset{OCH_3}{\mid}}{Si}}-]_{15}-O-CH_3$ |

Preparation of water curable, silane modified alkylene-alkyl acrylate copolymers was carried out as follows:

To a 300 cc Brabender mixer, heated to a temperature of 160° C. and maintained under a blanket of argon gas, there was added a copolymer of ethylene-ethyl acrylate, having a melt index of 1.2 and containing 16 percent by weight combined ethyl acrylate and 1,2-dihydro-2,3,4-trimethyl quinoline, an antioxidant. This mixture was fluxed and mixed rapidly for 2 minutes. To the fluxed mixture, there was added, by means of a syringe, a mixture of a polysiloxane of Example 1 or Example 2 and dibutyltin dilaurate. After homogeniety was reached in the Brabender, as indicated by a constant torque measurement, tetraisopropyl titanate was added to the contents of the Brabender. The contents of the Brabender were then maintained at a temperature of 160°–170° C. for a period of 30 minutes, resulting in a reaction whereby the polysiloxane reacted with the ethylene-ethyl acrylate copolymer as evidenced by an increase in torque. Volatiles which evolved during the reaction were condensed in a dry ice trap which was connected to the Brabender. At the end of the 30 minute period, the contents of the Brabender were discharged into a polyethylene bag under an atmosphere of argon.

Amount of materials used is noted in Table 2.

20 gram samples of silane modified copolymers, produced as described above, were pressed into plaques of the following dimensions: 3 inches×3 inches×0.075 inch in a five minute cycle at a temperature of 110°–115° C. under a pressure of 5000 psig.

Plaques were cured by being suspended in water, which was at a temperature of 70° C., for three hours. After the three hour water cure, the plaques were removed from the water, wiped dry and placed in a vacuum oven, which was at a temperature of 50° C., for one hour in order to insure removal of residual water.

The plaques, cured and uncured, were measured for degree of crosslinking, according to the Monsanto Rheometer test. This test procedure is described, more fully, in U.S. Pat. No. 4,018,852 to Donald L. Schober, granted Apr. 19, 1977. FIG. 1 of the drawing of this patent shows the typical Rheometer curve. The level of curing or crosslinking is designated as H and is measured in terms of inch-pounds of torque on the Rheometer test equipment.

Results are tabulated in Table 2.

TABLE 2

| | Parts by Weight | |
|---|---|---|
| | Example 5 | Example 6 |
| Ethylene-Ethyl Acrylate Copolymer | 98.0 | 98.0 |
| Polysiloxane of Example 1 | 1.5 | — |
| Polysiloxane of Example 2 | — | 1.5 |
| Dibutyltin Dilaurate | 0.04 | 0.04 |
| Tetraisopropyl Titanate | 0.46 | 0.46 |
| Monsanto Rheometer Test | Average of Two Plaques Tested | |
| Cured Plaques | 63 | 58 |
| Uncured Plaques | 16 | 17 |

EXAMPLE 7

This example could serve to illustrate the preparation of a polysiloxane by copolymerizing two monomeric silanes.

A 250 ml., round bottom, 3-necked flask, equipped with an air condenser, thermometer, gas inlet tube and magnetic stirring bar, is mounted securely in a liquid heating bath, positioned on a Cole-Palmer Instrument Co. stirrer-hot plate, and dried using a continuous flow of nitrogen. With the nitrogen sweep in operation, 104 grams of acetooxyethyltrimethoxy silane and 124 grams of γ-methacryloxypropyltrimethoxy silane are charged into the flask and the temperature thereof brought to about 75° C. At this point, 1.91 grams of stannous octoate are added while the contents of the flask are being heated. A reaction is initiated at a temperature of 115° C. as would be evidenced by rapid gas evolution. Heating is continued until the contents of the flask reach a temperature of 142° C. At this point, heating is discontinued and the reaction product in the flask cooled to room temperature.

It is expected that the resultant polysiloxane would have a viscosity of about 2 poise.

It is to be noted that mixtures of reactants, catalysts, additives and the like can be used if so desired.

What is claimed is:

1. A polysiloxane having the formula:

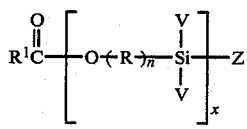

wherein R is a hydrocarbon radical or an oxy substituted hydrocarbon radical, $R^1$ is a hydrocarbon radical, each V is hydrogen, a hydrocarbon radical or a hydrolyzable group, Z is an alkoxy radical having one to 18 carbon atoms inclusive, n is an integer having a value of one to 18 inclusive and x is an integer having a value of at least 2.

2. A polysiloxane having the formula:

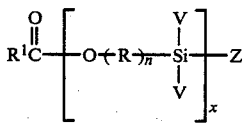

wherein R is an alkylene radical having one to 18 carbon atoms inclusive, $R^1$ is an alkyl radical having one to 18 carbon atoms inclusive or an alkylene radical having 2 to 18 carbon atoms inclusive, each V is an alkoxy radical having one to 18 carbon atoms inclusive, Z is an alkoxy radical having one to 18 carbon atoms inclusive, n is an integer having a value of one to 18 inclusive and x is an integer having a value of 5 to 25 inclusive.

3. A polysiloxane as defined in claim 1 derived from acetooxyethyltrimethoxy silane.

4. A polysiloxane as defined in claim 1 derived from a mixture of acetooxyethyltrimethoxy silane and γ-methacryloxypropyltrimethoxy silane.

5. A process of preparing a polysiloxane as defined in claim 1 which comprises reacting a mixture containing a metal carboxylate and a silane having the formula:

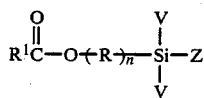

wherein R is a hydrocarbon radical or an oxy substituted hydrocarbon radical, $R^1$ is a hydrocarbon radical, each V is hydrogen, a hydrocarbon radical or a hydrolyzable group, Z is an alkoxy radical having one to 18 carbon atoms inclusive and n is an integer having a value of one to 18 inclusive.

6. A process as defined in claim 5 wherein the reaction is carried out at a temperature of about 70° C. to about 130° C.

7. A process as defined in claim 5 wherein the metal carboxylate is stannous octoate.

8. A process as defined in claim 5 wherein the metal carboxylate is dibutyltin dilaurate.

9. A process as defined in claim 5 wherein the silane is acetooxyethyltrimethoxy silane.

10. A process as defined in claim 5 wherein the silane is a mixture of acetooxyethyltrimethoxy silane and γ-methacryloxypropyltrimethoxy silane.

11. A process as defined in claim 5 wherein the metal carboxylate is present in an amount of about 0.001 to about 25 percent by weight based on the weight of the monomeric silane.

12. A process of preparing a polysiloxane as defined in claim 1 which comprises reacting a mixture containing aluminum isopropoxide or zirconium n-propoxide and a silane having the formula:

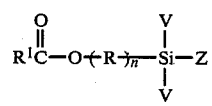

wherein the variables are as defined in claim 1.

13. A composition of matter comprising a metal carboxylate and a silane having the formula:

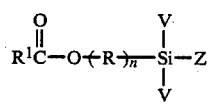

wherein R is a hydrocarbon radical or an oxy substituted hydrocarbon radical, $R^1$ is a hydrocarbon radical, each V is hydrogen, a hydrocarbon radical or a hydrolyzable group, Z is an alkoxy radical having one to 18 carbon atoms inclusive and n is an integer having a value of one to 18 inclusive.

14. A composition of matter comprising a metal carboxylate and a silane having the formula:

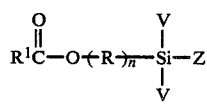

wherein R is an alkylene radical having one to 18 carbon atoms inclusive, $R^1$ is an alkyl radical having one to 18 carbon atoms inclusive or an alkylene radical having 2 to 18 carbon atoms inclusive, each V is an alkoxy radical having one to 18 carbon atoms inclusive, Z is an alkoxy radical having one to 18 carbon atoms inclusive and n is an integer having a value of one to 18 inclusive.

15. A composition of matter as defined in claim 13 wherein the silane is acetooxyethyltrimethoxy silane.

16. A composition of matter as defined in claim 13 wherein the silane is a mixture of acetooxyethyltrimethoxy silane and γ-methacryloxypropyltrimethoxy silane.

17. A composition of matter as defined in claim 13 wherein the metal carboxylate is stannous octoate.

18. A composition of matter as defined in claim 13 wherein the metal carboxylate is dibutyltin dilaurate.

19. A composition of matter as defined in claim 13 wherein the metal carboxylate is stannous octoate and the silane is acetooxyethyltrimethoxy silane.

20. A composition of matter as defined in claim 13 wherein the metal carboxylate is dibutyltin dilaurate and the silane is acetooxyethyltrimethoxy silane.

21. A composition of matter comprising a silane having the formula:

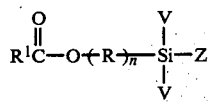

wherein R is a hydrocarbon radical or an oxy substituted hydrocarbon radical, R¹ is a hydrocarbon radical, each V is hydrogen, a hydrocarbon radical or a hydrolyzable group, Z is an alkoxy radical having one to 18 carbon atoms inclusive and n is an integer having a value of one to 18 inclusive; and an organo metallic catalyst which is aluminum isopropoxide or zirconium n-propoxide.

22. A composition of matter as defined in claim 21 wherein the silane has the formula:

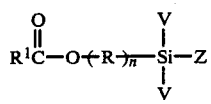

wherein R is an alkylene radical having one to 18 carbon atoms inclusive, R¹ is an alkyl radical having one to 18 carbon atoms inclusive or an alkylene radical having 2 to 18 carbon atoms inclusive, each V is an alkoxy radical having one to 18 carbon atoms inclusive, Z is an alkoxy radical having one to 18 carbon atoms inclusive and n is an integer having a value of one to 18 inclusive.

23. A composition of matter as defined in claim 21 wherein the silane is acetooxyethyltrimethoxy silane.

24. A composition of matter as defined in claim 21 wherein the organo metallic catalyst is aluminum isopropoxide.

25. A composition of matter as defined in claim 21 wherein the organo metallic catalyst is zirconium n-propoxide.

26. A composition of matter as defined in claim 21 wherein the silane is acetooxyethyltrimethoxy silane and the organo metallic catalyst is aluminum isopropoxide or zirconium n-propoxide.

27. A composition of matter as defined in claim 21 wherein the organo metallic catalyst is present in an amount of about 0.001 to about 25 percent by weight based on the weight of the silane.

28. A process of preparing a polysiloxane as defined in claim 1 which comprises reacting a mixture containing an organo metallic and a silane having the formula:

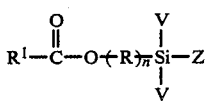

wherein R is a hydrocarbon radical or an oxy substituted hydrocarbon radical, R¹ is a hydrocarbon radical, each V is hydrogen, a hydrocarbon radical or a hydrolyzable group, Z is an alkoxy radical having one to 18 carbon atoms inclusive and n is an integer having a value of one to 18 inclusive.

* * * * *

UNITED STATES PATENT AND TRADEMARK OFFICE
CERTIFICATE OF CORRECTION

PATENT NO. : 4,552,941
DATED      : November 12, 1985
INVENTOR(S) : Michael J. Keogh It is certified that error appears in the above-identified patent and that said Letters Patent is hereby corrected as shown below:

Claim 28, line 3; "organo metallic" should read -- organo metallic catalyst --

Signed and Sealed this

Eighteenth Day of February 1986

[SEAL]

Attest:

DONALD J. QUIGG

Attesting Officer

Commissioner of Patents and Trademarks